C. FOSTER, Dec'd,

L. H. ROGERS assignee by mesne assignments.

Letter-Sheet Envelope.

No. 8,206. Reissued April 30, 1878.

WITNESSES

E. A. Brick

D. P. Cowl

INVENTOR

Charles Foster

Lebbeus H. Rogers assignee by A. Pollok ATTORNEY

UNITED STATES PATENT OFFICE.

LEBBEUS H. ROGERS, OF NEW YORK, N. Y., ASSIGNEE, BY MESNE ASSIGNMENTS, OF CHARLES FOSTER, DECEASED.

IMPROVEMENT IN LETTER-SHEET ENVELOPES.

Specification forming part of Letters Patent No. 123,389, dated February 6, 1872; Reissue No. 8,206, dated April 30, 1878; application filed February 27, 1878.

*To all whom it may concern:*

Be it known that CHARLES FOSTER, of Cortland Village, in the county of Cortland and State of New York, now deceased, did, during his lifetime, invent certain new and useful Improvements in Letter Sheets or Paper which may be sealed, and thus dispense with the use in connection therewith of envelopes; and I hereby declare the following to be a full, clear, and exact description of the same, reference being had to the accompanying drawing, in which—

Figure 1:
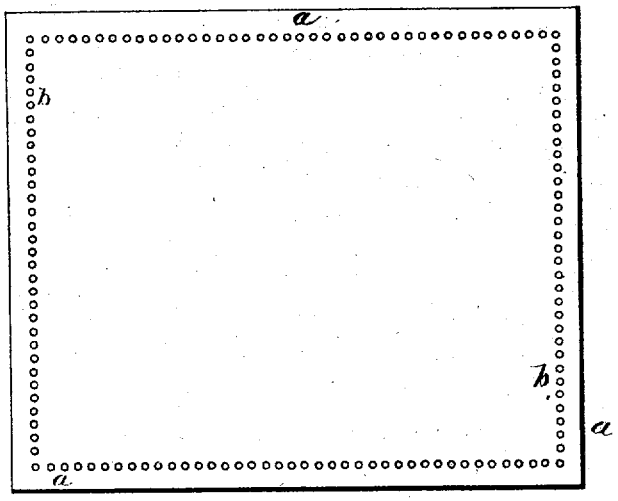
Figure 2:
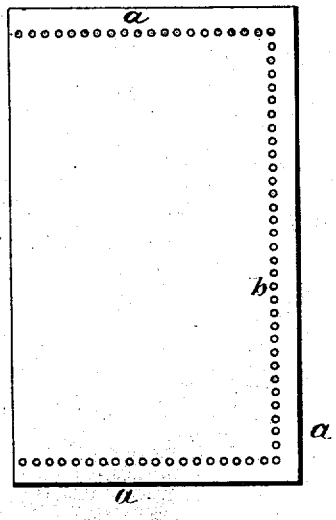

Figure 1 is a surface view or elevation of a sheet of paper embodying the said invention. Fig. 2 shows the same when folded in letter form and sealed.

The invention relates more particularly to the preparing of business letter-paper, so that the same may be folded and sealed after the letter is written, without using any envelope, by gumming portions of the edges thereof; and, further, by a series of small holes punched around the sheet near its edge, enabling the receiver of the letter to easily open it and remove the gummed portions by tearing off the edges through the punched lines.

To enable others to make and use the said invention, I shall now proceed to describe in illustration of the same a sheet of paper, *a*, made and to be used in accordance with said invention. It may be made somewhat wider and shorter than the half-sheet of what is usually called "business note-paper." Near the edges of this sheet, across the ends and sides, is punched a continuous line of small holes, *b*, near enough together to insure the tearing of the paper upon such line. The space between the punched line and the edge of the sheet, upon each side thereof from the center to the top of the sheet, and also across the top of the sheet, is gummed with any of the usual adhesive gums, and the gum allowed to dry. The sheet is then ready for use.

The letter is written within the punched lines of holes, the gum is moistened, and the sheet folded by one fold through the middle. This brings the punched lines of the top and bottom of the sheet together, and also those of the sides are folded, the lower upon the upper half on each side, and the gum seals them together all round. The letter then assumes the appearance indicated in Fig. 2, and is ready for direction.

To open the letter, the strips upon the edge outside the punched lines are torn off, and the letter is freed from all gum, and ready to be filed away with the postmark and direction upon it, and always remaining upon it. The punched lines serve the double purpose of forming a space for the gum outside of them, and also forming a line through which the paper shall tear in opening the letter.

What I claim as the invention of said CHARLES FOSTER is—

1. A sheet of writing-paper with opposite detachable sealing-borders.

2. A sheet of writing-paper having opposite sealing-borders and perforations so applied to admit of the severing and detaching of the sealed border.

3. As a new article of manufacture, a letter-sheet of paper gummed and punched, substantially as and for the purposes herein set forth.

In testimony whereof I have hereunto signed my name this 27th day of February, A. D. 1878.

LEBBEUS H. ROGERS.

Witnesses:

EWELL A. DICK,

A. POLLOK.